Dec. 1, 1925.
H. H. WHITCOMB
BEVERAGE MIXER
Filed March 19, 1925
1,563,413
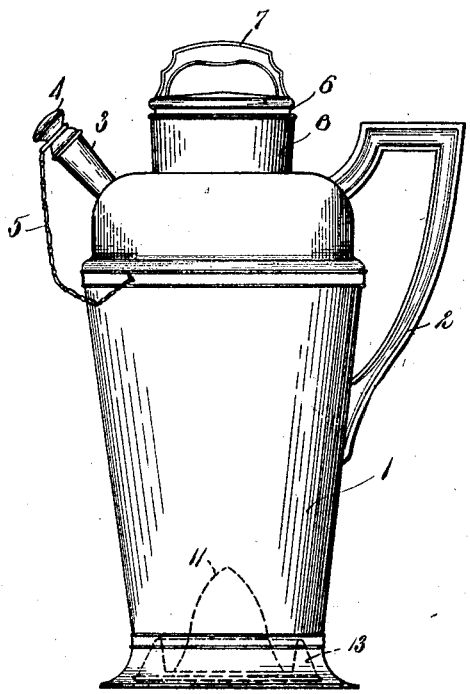
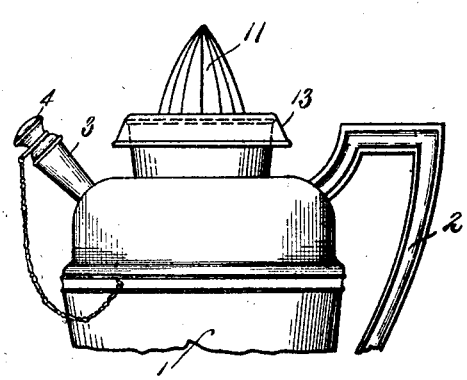
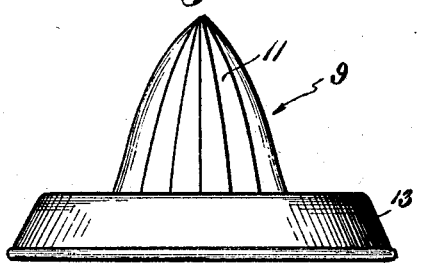
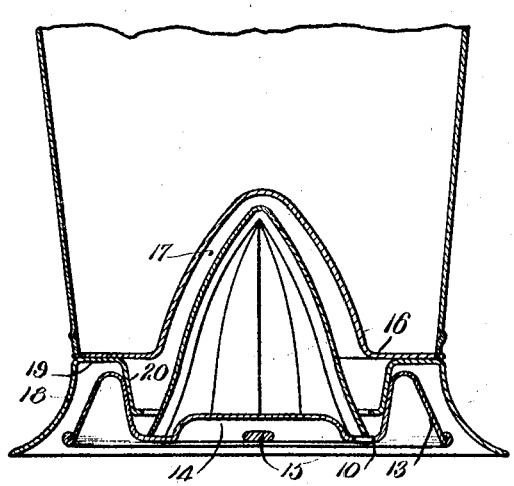
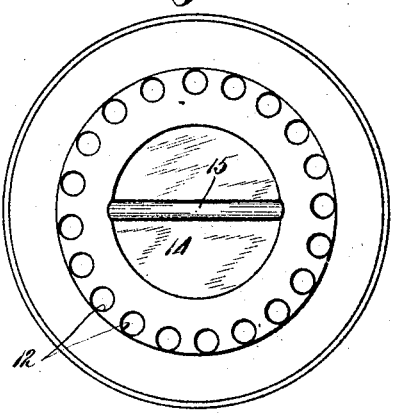
Inventor:
Herbert H. Whitcomb
by Franklin T. Pulley Jr.
Attorney.

Patented Dec. 1, 1925.

1,563,413

UNITED STATES PATENT OFFICE.

HERBERT H. WHITCOMB, OF ARLINGTON, MASSACHUSETTS, ASSIGNOR TO M. W. CARR & COMPANY, INC., A CORPORATION OF MASSACHUSETTS.

BEVERAGE MIXER.

Application filed March 19, 1925. Serial No. 16,651.

*To all whom it may concern:*

Be it known that I, HERBERT H. WHITCOMB, a citizen of the United States, and a resident of Arlington, in the county of Middlesex and Commonwealth of Massachusetts, have invented a certain new and useful Improvement in Beverage Mixers, of which the following is a specification.

My invention relates to that type of beverage mixer commonly known as a shaker wherein fruit juices, such as the juice of the orange and the lemon, are frequently mixed with other liquids and shaken together with cracked ice placed within the mixer or shaker. It has been the special object of my invention to provide in connection therewith an element for extracting the juice of the orange or lemon so that it may when extracted fall directly into the mixer, and further to provide means whereby said juice extractor may be conveniently placed and maintained in association with the beverage mixer, so that it may be at all times conveniently located for use and readily detached and placed in operative position.

My device may be best understood by reference to the accompanying drawings, in which Fig. 1 is a side view of my mixer, showing by dotted lines the location of the juice extractor when secured to the mixer when the extractor is not in use.

Fig. 2 is a side view of the top of my mixer showing the juice extractor in operative position.

Fig. 3 is a side view of the juice extractor.

Fig. 4 is a vertical section of the base of my mixer showing the juice extractor attached within the hollowed base of the mixer.

Fig. 5 is a bottom view of the juice extractor.

Referring now more specifically to the drawings, 1 is a metallic container portion of my mixer, which is provided with the usual handle 2 and the pouring spout 3. Pouring spout 3 is closed by a removable stopper 4 which is attached by chain 5 to the container 1. A stopper 6, provided with a handle 7, fits within the neck 8 of the container 1. The juice extractor 9 is preferably made of metal and is provided with a thin metallic base 10, upon which is mounted an upwardly extending corrugated crushing point 11, so as to form a channel around the base of the crushing point wherein juices may be collected. A series of holes 12 at the bottom of this channel permit the juices to drain downward. The base 10, after being turned upward as described, is again bent sharply downward to form an annular skirt 13, which is arranged to fit over the neck 8 of the container 1 (see Fig. 2). The central portion of the base 10 of the juice extractor 9 is slightly inset so as to form a recess 14, across which extends a bar 15.

The base 16 of the container 1 has a central inset portion forming a space 17. Attached to the base 10 of the container 1 is a flaring annular skirt 18 upon which the whole device rests. The top portion 19 of this flaring annular skirt is attached for a short distance to the base 16 and is then bent downward so as to form an annular flange 20 which slants inwardly to a slight degree.

When the juice extractor is not in use it may be inserted within space 17 in the bottom of the container 1 and pressed into engagement with the annular flange 20, depending from the base, which annular flange 20 is arranged to have a firm uniform frictional contact with the upturned and outward extending portion of the base 10 of the juice extractor (see Fig. 4). When placed in the position shown in Fig. 4, the juice extractor is wholly elevated above the bottom of the flaring skirt 18 upon which the device rests.

From the foregoing it will be apparent that when it is desired to use the juice extractor with my mixer it can be readily withdrawn from its inoperative position in the base of the container by seizing between the thumb and finger the cross-bar 15 and pulling thereon with a slight twisted motion. The juice extractor may then be placed in operative position upon the neck of the container, as shown in Fig. 2. The replacing of the juice extractor to its place of retirement within the base of the mixer can be almost instantly accomplished, and I find that a very slight pressure is required to hold it so firmly in engagement with the flange 20 that it cannot be shaken loose by the ordinary handling of the device when employed as a shaker.

The convenience of thus having always in association with the mixer a juice extractor designed to fit the top thereof, where juices may drain directly into the shaker, is a matter of great advantage.

Having thus fully described my invention, what I claim is:

1. In a device of the character specified the combination of a container provided with a base having an inset portion, a juice extractor adapted to fit over the mouth of said container, and means whereby said juice extractor may be removably supported within said inset portion of said base.

2. In a device of the character specified the combination of a container provided with a base having an inset portion, a juice extractor adapted to fit over the mouth of said container, and means whereby said juice extractor may be removably supported within said inset portion of said base by frictional engagement.

3. In a device of the character specified the combination of a container provided with a base having an inset portion, a juice extractor adapted to fit over the mouth of said container and provided with an annular inwardly slanting rim, an annular outwardly flaring flange depending from the base of said container within which said annular rim of said juice extractor is adapted to fit closely so as to be retained in position by frictional engagement therewith.

In witness whereof I have hereunto affixed my signature.

HERBERT H. WHITCOMB.